(12) United States Patent
Nishida

(10) Patent No.: US 9,764,644 B2
(45) Date of Patent: Sep. 19, 2017

(54) VEHICLE

(71) Applicant: HONDA MOTOR CO., LTD., Tokyo (JP)

(72) Inventor: Makoto Nishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/781,089

(22) PCT Filed: Dec. 2, 2014

(86) PCT No.: PCT/JP2014/081866
§ 371 (c)(1),
(2) Date: Sep. 29, 2015

(87) PCT Pub. No.: WO2015/083698
PCT Pub. Date: Jun. 11, 2015

(65) Prior Publication Data
US 2016/0046191 A1    Feb. 18, 2016

(30) Foreign Application Priority Data

Dec. 2, 2013  (JP) .................................. 2013-249612

(51) Int. Cl.
*B60K 1/00*   (2006.01)
*B60L 3/00*   (2006.01)
(Continued)

(52) U.S. Cl.
CPC  *B60L 3/00* (2013.01); *B60K 1/00* (2013.01); *B60K 1/02* (2013.01); *B60K 6/00* (2013.01);
(Continued)

(58) Field of Classification Search
CPC ... B60K 1/00; B60K 1/02; B60K 7/00; B60K 7/0007; B60K 2007/0038; B60K 2007/0092
See application file for complete search history.

(56) References Cited

U.S. PATENT DOCUMENTS 5,927,417 A * 7/1999 Brunner ................... B60K 1/02
                                                    180/374
6,321,865 B1 * 11/2001 Kuribayashi .......... B60K 6/365
                                                    180/243
(Continued)

FOREIGN PATENT DOCUMENTS

JP   2000-92623 A   3/2000
JP   2011-116250 A  6/2011
(Continued)

OTHER PUBLICATIONS

International Search Report dated Feb. 24, 2015, issued in counterpart application No. PCT/JP2014/081866 (2 pages).
(Continued)

*Primary Examiner* — J. Allen Shriver, II
*Assistant Examiner* — Travis Coolman
(74) *Attorney, Agent, or Firm* — Westerman, Hattori, Daniels & Adrian, LLP

(57) ABSTRACT

A vehicle includes a motor disposed so as to be offset to one side with respect to a center of the vehicle in a front-to-rear direction and a frame member for supporting the motor via at least two supporting devices. A first fixing portion which is situated relatively closer to the one side is formed in a higher position in a vertical direction than a second fixing portion which is situated closer to the other side. An electric wire fixing portion of the motor is formed in a position below an imaginary straight line which passes through a
(Continued)

center of the first fixing portion and a center of the second fixing portion, in a side view of the motor.

20 Claims, 6 Drawing Sheets

(51) Int. Cl.
*B60K 1/02* (2006.01)
*B60K 6/00* (2006.01)
*B60K 17/16* (2006.01)

(52) U.S. Cl.
CPC ........ *B60K 17/16* (2013.01); *B60K 2001/001* (2013.01)

(56) References Cited

U.S. PATENT DOCUMENTS

| | | | | |
|---|---|---|---|---|
| 6,656,069 | B2 * | 12/2003 | Sugano | B60K 6/405 474/28 |
| 7,262,579 | B1 * | 8/2007 | Shepard | B60K 6/46 318/727 |
| 7,527,114 | B2 * | 5/2009 | Wendl | B60K 7/0007 180/65.51 |
| 7,653,987 | B2 * | 2/2010 | Tokuda | B60K 7/0007 140/92.1 |
| 8,172,019 | B2 * | 5/2012 | Takeda | B60K 1/00 180/65.1 |
| 8,727,923 | B2 * | 5/2014 | Huelsemann | B60K 7/0007 475/5 |
| 8,733,492 | B2 * | 5/2014 | Tachibana | B60K 1/00 180/291 |
| 8,770,326 | B2 * | 7/2014 | Matano | B60K 1/04 180/65.1 |
| 8,776,936 | B2 * | 7/2014 | Mimura | B60K 7/0007 180/220 |
| 8,941,275 | B2 * | 1/2015 | Genda | B60K 1/02 310/114 |
| 9,010,479 | B2 * | 4/2015 | Kambayashi | B60K 1/00 180/291 |
| 9,045,029 | B2 * | 6/2015 | Mair | B60K 7/0007 |
| 9,067,615 | B2 * | 6/2015 | Kashiwai | B62K 25/28 |
| 9,193,258 | B2 * | 11/2015 | Hoshinoya | B60K 11/02 |
| 9,216,638 | B2 * | 12/2015 | Katayama | B60K 1/04 |
| 9,230,713 | B2 * | 1/2016 | Adachi | B60K 28/14 |
| 9,330,813 | B2 * | 5/2016 | Adachi | H01B 7/009 |
| 2004/0079574 | A1 * | 4/2004 | Ono | B62K 25/283 180/252 |
| 2005/0011687 | A1 * | 1/2005 | Yamaguchi | B60K 6/48 180/65.1 |
| 2013/0137303 | A1 | 5/2013 | Yazaki et al. | |
| 2013/0241282 | A1 * | 9/2013 | Ikeno | B60R 16/0215 307/10.1 |
| 2014/0311812 | A1 * | 10/2014 | Kambayashi | B60H 1/3223 180/65.1 |
| 2014/0311842 | A1 * | 10/2014 | Kambayashi | B60K 1/00 188/371 |
| 2014/0354044 | A1 * | 12/2014 | Goto | B60L 3/0023 307/9.1 |
| 2015/0314830 | A1 * | 11/2015 | Inoue | B60K 1/04 180/220 |
| 2015/0329168 | A1 * | 11/2015 | Kawabata | B62J 11/00 318/139 |
| 2016/0039277 | A1 * | 2/2016 | Falls | B60K 1/02 180/62 |
| 2016/0039308 | A1 * | 2/2016 | Fushimi | B60K 1/00 180/65.31 |
| 2016/0153172 | A1 * | 6/2016 | Naito | B60K 1/00 180/65.21 |
| 2016/0168821 | A1 * | 6/2016 | Naito | B60K 1/00 180/65.21 |

FOREIGN PATENT DOCUMENTS

| | | |
|---|---|---|
| JP | 2012-144142 A | 8/2012 |
| JP | 2013-95152 A | 5/2013 |
| JP | 2013-103589 A | 5/2013 |

OTHER PUBLICATIONS

Extended (supplementary) European Search Report dated Jun. 7, 2017, issued in counterpart European Patent Application No. 14867351.0. (6 pages).

* cited by examiner

//VEHICLE

TECHNICAL FIELD

The present invention relates to a vehicle which includes a motor for driving wheels of the vehicle.

BACKGROUND ART

An electrically driven vehicle such as an electric vehicle or a hybrid vehicle includes a vehicle driving motor, and normally, the motor is disposed so as to be offset to one side of a passenger compartment (a cabin) which is situated at a center of the electrically driven vehicle in a front-to-rear direction thereof.

For example, in an electrically driven vehicle described in Patent Literature 1, as shown in FIG. 6A, a driving unit 101 which includes a motor is disposed ahead of a dash panel 100 which defines a passenger compartment. The driving unit 101 is supported by mounting devices at upper end portions of left and right end portions thereof and at a rear lower end portion thereof, and the rear lower end portion is supported so as to rotate about an axis which extends in the vehicle's width direction. Consequently, when the vehicle is involved in a frontal collision, the driving unit 101 rotates upwards about the rear lower end portion as a fulcrum (in a direction indicated by an arrow R in FIG. 6B), and an electric compressor 102 which is provided at a front end portion of the driving unit 101 is also rotated upwards, whereby a load exerted on the driving unit 101 is dispersed so that a load to be applied to the passenger compartment via the driving unit 101 can be suppressed.

Additionally, in the electrically driven vehicle described in Patent Literature 1, high-pressure cables 103, 104 are disposed between the driving unit 101 and the dash panel 100 which defines the passenger compartment. The high-pressure cable 103 is a cable which connects a main battery with an inverter 105, and the high-pressure cable 104 is a cable which connects the inverter 105 with a motor unit 106.

PRIOR ART LITERATURE

Patent Literature

Patent Literature 1: JP-A-2012-144142

SUMMARY OF THE INVENTION

Problem that the Invention is to Solve

In the electrically driven vehicle described in Patent Literature 1, however, when the vehicle is involved in a frontal collision which would affect the driving unit 101 largely (hereinafter, referred to as a frontal collision), the driving unit 101 and the electric compressor 102 are rotated towards the passenger compartment. As this occurs, should the high-pressure cable 104 be dislocated, there have been fears that the dislocated high-pressure cable 104 is directed towards the passenger compartment.

The invention provides a vehicle which can reduce a negative dynamic influence to a passenger compartment when involved in a collision and which is electrically highly safe.

Means for Solving the Problem

The invention provides the following aspects. According to a first aspect, there is provided a vehicle (e.g., a vehicle 3 in embodiment) including:

a motor (e.g., a first and a second motor 2A, 2B in embodiment), which drives a wheel (e.g., a rear wheel Wr in embodiment) of the vehicle; and a frame member (e.g., a sub-frame 13 in embodiment), which supports the motor via at least two supporting devices (e.g., brackets 81A, 81B, supporting portions 82A, 82B), wherein:

the motor is disposed so as to be offset to one side (e.g., a rear side in embodiment) with respect to a center of the vehicle in a front-to-rear direction thereof;

a first fixing portion (e.g., rear fixing portions 92A, 92B in embodiment) which is situated relatively closer to the one side, of fixing portions (e.g., rear fixing portions 92A, 92B, front fixing portions 91A, 91B in embodiment) of the motor to which the at least two supporting devices are fixed, is formed in a higher position in a vertical direction than a second fixing portion (e.g., front fixing portions 91A. 91B in embodiment) which is situated closer to the other side (e.g., a front side in embodiment); and an electric wire fixing portion (e.g., a first and a second connector 101A, 101B in embodiment) of the motor to which an electric wire (e.g., a conductive cable 103A, 103B in embodiment) for supplying electric power to the motor is fixed, is formed in a position below an imaginary straight line (e.g., an imaginary straight line y in embodiment) which passes through a center of the first fixing portion and a center of the second fixing portion, in a side view of the motor.

In addition to the configuration according to the first aspect, a second aspect is characterized in that the electric wire fixing portion is formed closer to the other side than another imaginary straight line (e.g., another imaginary line z in embodiment) which passes through a rotating axis (e.g., a rotating axis x in embodiment) of the motor and intersects the imaginary line at a right angle.

In addition to the configuration according to the second aspect, a third aspect is characterized in that the electric wire fixing portion is formed below the first fixing portion.

In addition to the configuration according to the third aspect, a fourth aspect is characterized in that the supporting device which is fixed to the first fixing portion, or the frame member on which the supporting device is provided, is disposed so as to cover the electric wire fixing portion from above.

In addition to the configuration according to anyone of the first to fourth aspects, a fifth aspect is characterized in that the vehicle includes electric wire supporting devices (e.g., an electric wire supporting bracket 88 in embodiment). which support the electric wire on the frame member or a body member (e.g., a floor panel 171 in embodiment), and an electric wire supporting device, which is nearest to the motor, of the electric wire supporting devices, is disposed in such a position that a distal end of the electric wire is prevented from reaching a ground when the electric wire is dislocated from the motor and droops vertically from the electric wire supporting device as a fulcrum.

In addition to the configuration according to anyone of the first to fifth aspects, a sixth aspect is characterized in that a distance (e.g., a distance L1 in embodiment) from the rotating axis of the motor to a distal end portion of the first fixing portion is shorter than a distance (e.g., a distance L2 in embodiment) from the rotating axis to a distal end portion of the second fixing portion.

Advantage of the Invention

In the event that the motor is disposed so as to be offset to one side of the passenger compartment of the vehicle, there are fears that a large magnitude of external force acts when an external force is applied from one side of the electric motor. However, according to the first aspect, the positional relationship between the fixing portions where the supporting devices are fixed in place is configured so that the first fixing portion which is situated closer to the one side of the motor is positioned higher the second fixing portion which is situated closer to the other side of the motor in the vertical direction, whereby when an external force is inputted from the one side, there is produced a moment which causes the one side to rise upwards and the other side to fall downwards. As this occurs, since the electric wire fixing portion is formed on the motor in the position below the imaginary straight line which passes through the center of the first fixing portion and the center of the second fixing portion, should the electric wire be dislocated from the motor, the dislocated electric wire has difficulty in being directed towards the passenger compartment, thereby making it possible to enhance the safety of the passengers in collision from the mechanical and electrical point of view.

According to the second aspect, since it becomes difficult that the electric wire is dislocated, the safety of the passengers in collision can be enhanced further.

According to the third aspect, since it becomes more difficult that the dislocated electric wire reaches the passenger compartment, the safety of the passengers in collision can be enhanced further.

According to the fourth aspect, the electric wire fixing portion is protected against an object which falls from thereabove.

According to the fifth aspect, should the electric wire be dislocated, the dislocated electric wire can be restricted from touching the ground.

According to the sixth aspect, even though the motor rotates about the rotating axis of the motor when the vehicle is involved in a collision, since a longer portion of the dislocated electric wire moves away from the passenger compartment, the safety of the passengers when the external force is applied from the one side of the motor can be enhanced.

MODE FOR CARRYING OUT THE INVENTION

Figure 1:
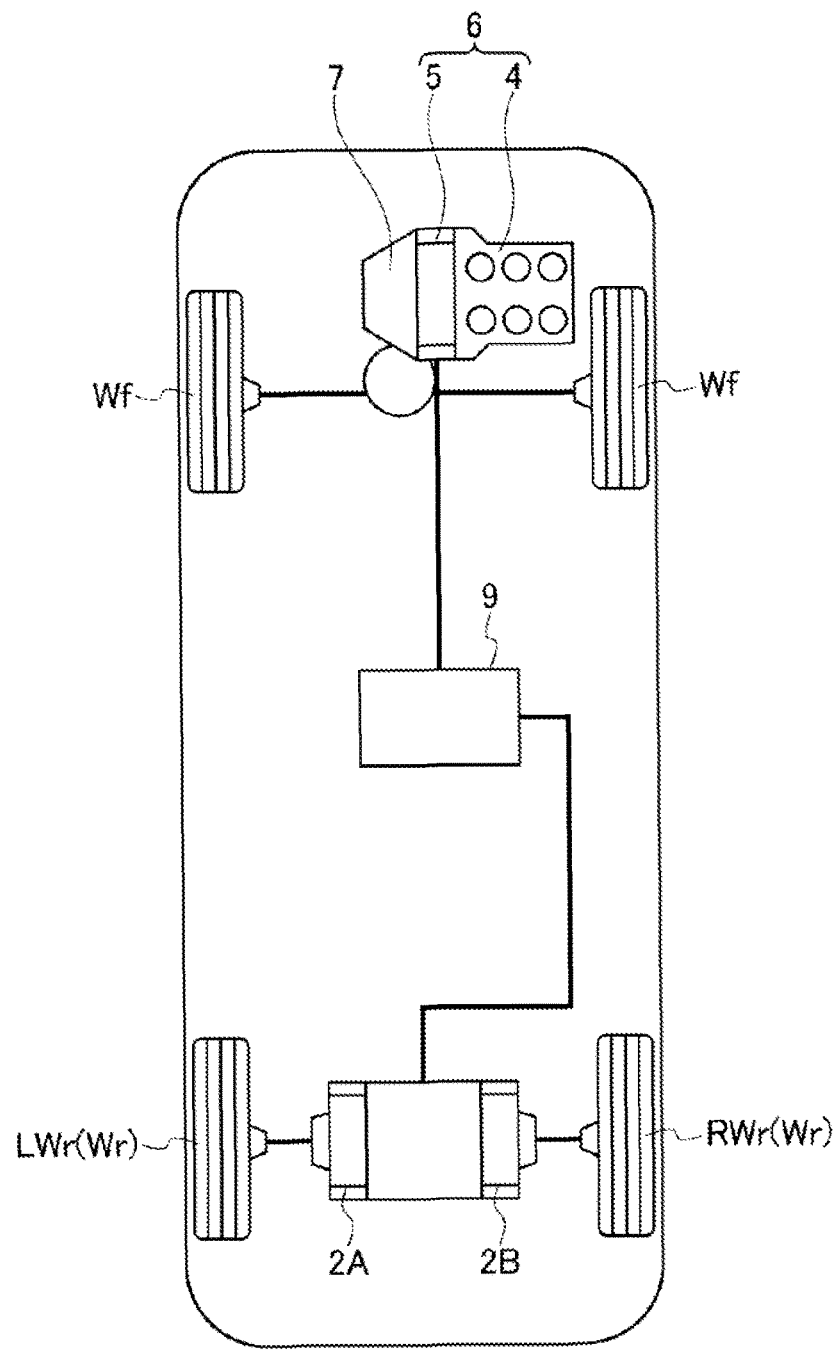
FIG. 1 is a block diagram showing a schematic configuration of a hybrid vehicle according to an embodiment of the invention.

Hereinafter, a vehicle according to this embodiment will be described by taking a hybrid vehicle as an example. A vehicle 3 shown in FIG. 1 is a hybrid vehicle having a driving system 6 (hereinafter, referred to as a front wheel driving system) in which an internal combustion engine 4 and a motor 5 are connected in series at a front portion of the vehicle. Power of this front wheel driving system 6 is transmitted to front wheels Wf via a transmission 7, while power of a driving system 1 (hereinafter, referred to as a rear wheel driving system) which is provided below a floor panel (not shown) at a rear portion of the vehicle separately from the front wheel driving system 6 is transmitted to rear wheels Wr (RWr, LWr). The rear wheel driving system 1 includes a first and a second motor 2A, 2B, and power of the first motor 2A is transmitted to the left rear wheel LWr, and power of the second motor 2B is transmitted to the right rear wheel RWr. The motor 5 of the front wheel driving system 6 and the first and second motors 2A, 2B of the rear wheel driving system 1 are connected to a battery 9, so that electric power can be supplied from the battery 9 to the front and rear wheel driving systems 5, 6 and energy can be recovered from the front and rear wheel driving systems 5, 6 to the battery 9.

Figure 2:
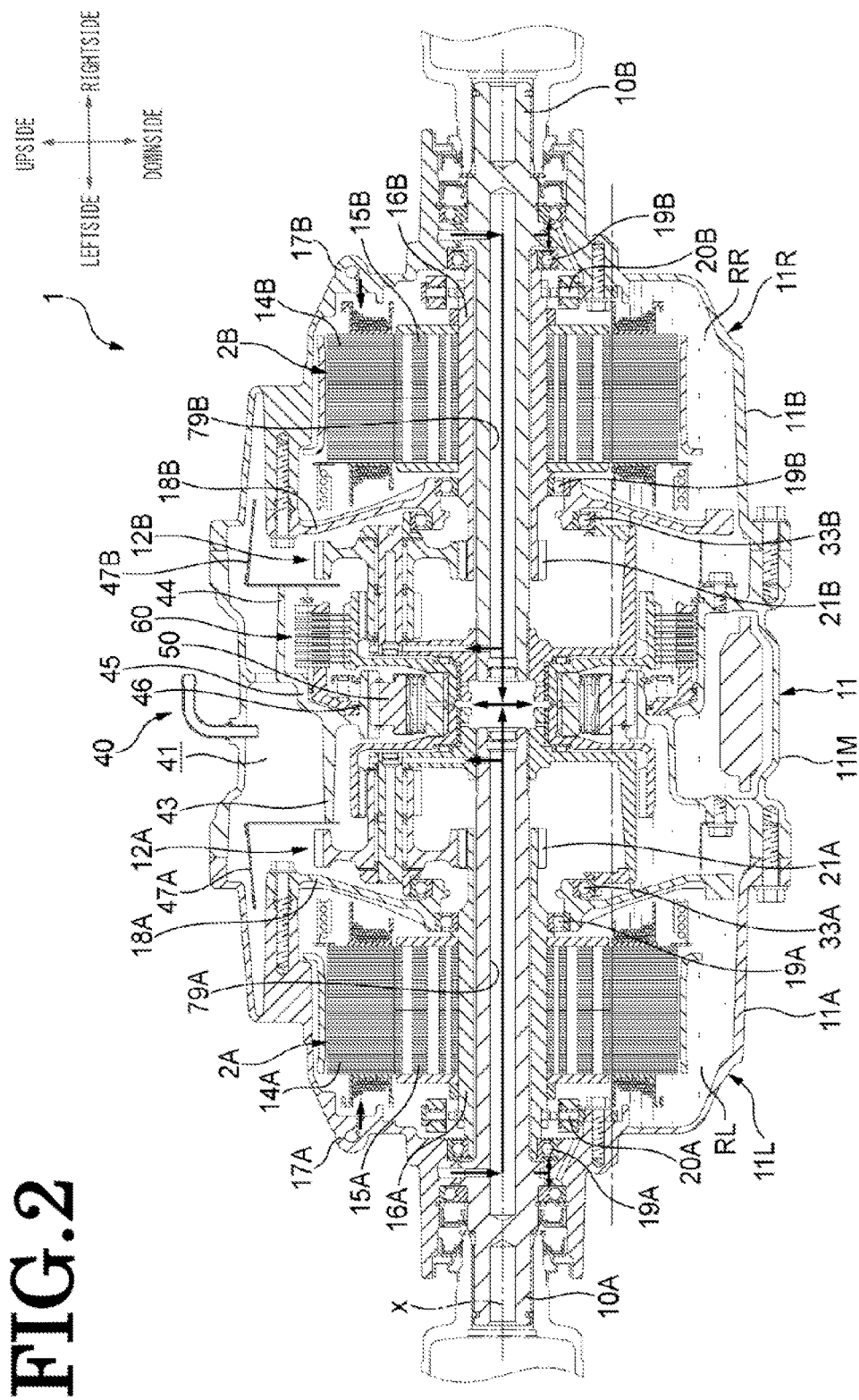
FIG. 2 is a vertical sectional view of a rear wheel driving system having a motor.
Figure 3:
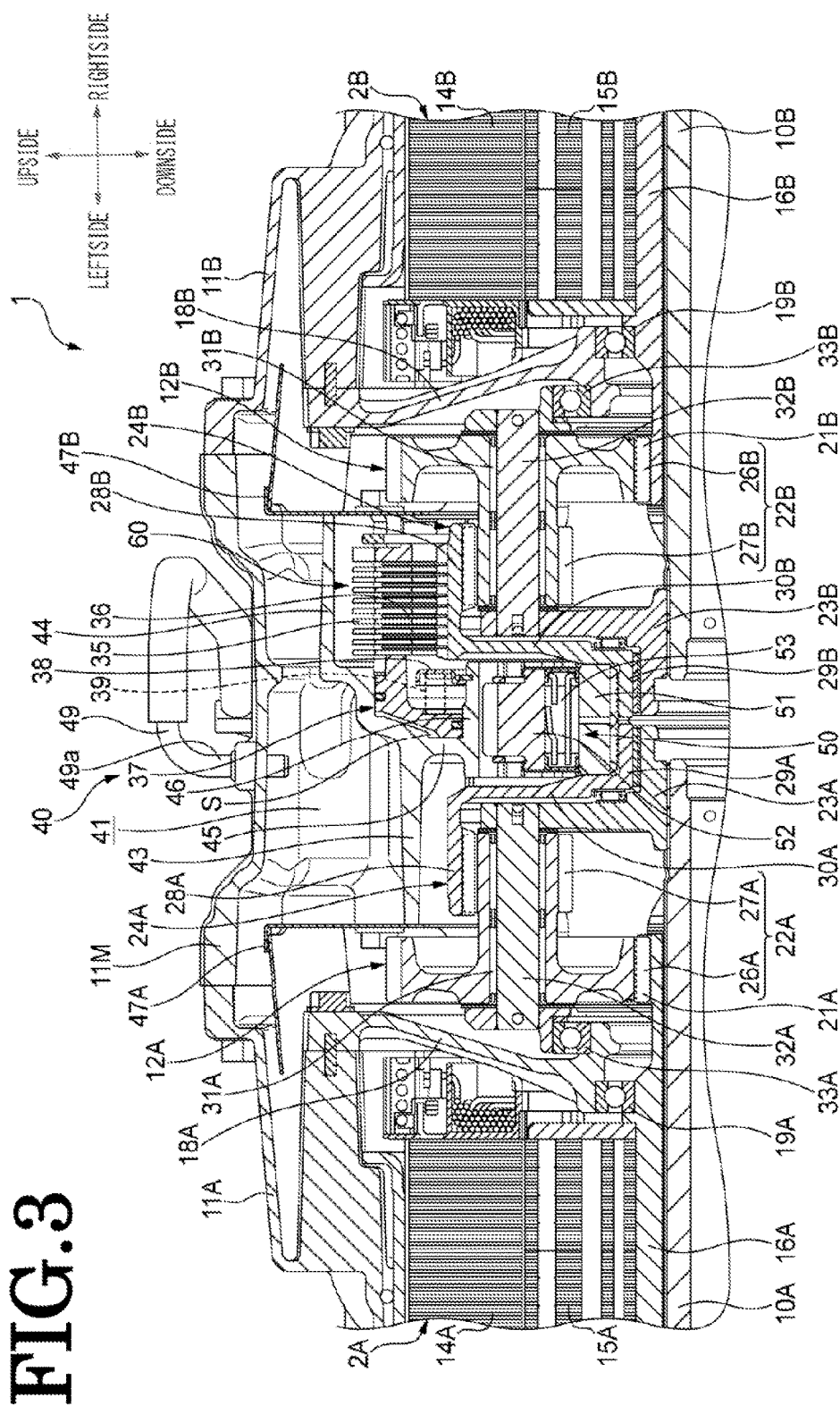
FIG. 3 is an enlarged sectional view of an upper portion of the rear wheel driving system shown in FIG. 2.

FIG. 2 shows a vertical sectional view of the whole of the rear wheel driving system 1, and FIG. 3 is a partially enlarged sectional view of an upper portion of FIG. 2. A case 11, which is a housing of the rear wheel driving system 1, includes a central case 11M which is disposed at a substantially central portion in a vehicle's width direction (hereinafter, also referred to as a left-right direction of the vehicle), and a left side case 11A and a right side case 11B which are disposed on left and right sides of the central case 11M so as to sandwich the central case 11M therebetween. The case 11 has a substantially cylindrical shape as a whole. Inside of the case 11, axles 10A, 10B for the rear wheels Wr, the first and second motors 2A, 2B for driving the axles, and a first and a second planetary gear type speed reducer 12A, 12B as a first and a second speed changer which decelerate the driving rotations of the first and second motors 2A, 2B are disposed so as to be aligned with each other on the same rotating axis x. The axle 10A, the first motor 2A and the first planetary gear type speed reducer 12A control to drive the left rear wheel LWr, and the axle 10B, the second motor 2B and the second planetary gear type speed reducer 12B control to rotate the right rear wheel RWr. The axle 10A, the first motor 2A and the first planetary gear type speed reducer 12A are disposed symmetrical laterally with the axle 10B, the second motor 2B and the second planetary gear type speed reducer 12B in the vehicle's width direction within the case 11.

Partition walls 18A, 18B which extend radially inwards are provided individually on sides of the side cases 11A, 11B which face the central case 11M, and the first and second motors 2A, 2B are disposed between the side cases 11A, 11B and the partition walls 18A. 18B respectively. Additionally, the first and second planetary gear type speed reducers 12A, 12B are disposed within a space which is surrounded by the central case 11M and the partition walls 18A, 18B. As shown in FIG. 2, in this embodiment, the left side case 11A and the central case 11M define a first case 11L which houses the first motor 2A and the first planetary gear type speed reducer 12A, and the right side case 11B and the central case 11M define a second case 11R which houses the second motor 2B and the second planetary gear type speed reducer 12B. Additionally, the first case 11L has a left reservoir portion RL which reserves oil as a liquid medium which is used to lubricate and/or cool at least one of the first motor 2A and the power transmission path. The second case 11R has a right reservoir portion RR which reserves oil which is used to lubricate and/or cool at least one of the second motor 2B and the power transmission path.

In the rear wheel driving system 1, a breather device 40 which establishes a communication between the inside and outside of the case 11 is provided so that air in the interior of the case 11 is released to the outside via a breather chamber 41 to prevent the air from being extremely heated to high temperatures or being extremely pressurized to high pressures in the interior of the case 11. The breather chamber 41 is disposed at a vertically upper portion in the case 11 and is constituted by a space defined by an external wall of the central case 11M, a first cylindrical wall 43 which is provided in the central case 11M so as to extend substantially horizontally towards the left side case 11A, a second cylindrical wall 44 which is provided so as to extend substantially horizontally towards the right side case 11B, a left-right separating wall 45 which connects together inner end portions of the first and second cylindrical walls 43, 44, a baffle plate 47A which is mounted so as to be brought into abutment with a distal end portion of the first cylindrical wall 43 which faces the left side case 11A, and a baffle plate 47B which is mounted so as to be brought into abutment with a distal end portion of the second cylindrical wall 44 which faces the right side case 11B.

In the first and second cylindrical walls 43, 44 and the left-right separating wall 45 which define a lower surface of the breather chamber 41, the first cylindrical wall 43 is situated further radially inwards than the second cylindrical wall 44, and the left-right separating wall 45 extends to an inner end portion of the first cylindrical wall 43 while bending so as to be radially contracted from an inner end portion of the second cylindrical wall 44, and extends further radially inwards to reach a third cylindrical wall 46 which extends substantially horizontally. The third cylindrical wall 46 is situated further inwards than outer end portions of both the first cylindrical wall 43 and the second cylindrical wall 44 and substantially in the center therebetween.

In the central case 11M, the baffle plates 47A, 47B are fixed so as to divide a space defined between the first cylindrical wall 43 and an external wall of the central case 11M or a space defined between the second cylindrical wall 44 and the external wall of the central case 11M from the first planetary gear type speed reducer 12A or the second planetary gear type speed reducer 12B.

Additionally, an external communication passageway 49 which establishes a communication between the breather chamber 41 and the outside thereof is connected to a vertically upper surface of the breather chamber 41 in the central case 11M. A breather chamber side end portion 49a of the external communication passageway 49 is disposed so as to be directed vertically downwards. Consequently, the oil is prevented from being discharged to the outside through the external communication passageway 49.

In the first and second motors 2A 2B, stators 14A 14B are fixed to the side cases 11A, 11B, respectively, and annular rotors 15A, 15B are disposed, respectively, on inner circumferential sides of the stators 14A, 14B so as to rotate relatively to the stators 14A, 14B. Cylindrical shafts 16A, 16B which surround outer circumferences of the axles 10A, 10B are connected to inner circumferential portions of the rotors 15A, 15B, respectively, and the cylindrical shafts 16A, 16B are supported in end walls 17A, 17B of the side cases 11A, 11B and the partition walls 18A, 18B via bearings 19A, 19B so as to rotate relative to the axles 10A and 10B coaxially. Additionally, resolvers 20A, 20B, which are configured to feed back information on rotational positions of the rotors 15A. 15B to a controller (not shown) which controls the first and second motors 2A, 2B, are provided on outer circumferences of ends of the cylindrical shafts 16A, 16B and on the end walls 17A, 17B.

The first and second planetary gear type speed reducers 12A, 12B include sun gears 21A, 21B, ring gears 24A, 24B which are situated on outer circumferential sides of the sun gears 21A, 21B, a plurality of planetary gears 22A, 22B which mesh with the sun gears 21A, 21B and the ring gears 24A, 24B, and planetary carriers 23A, 23B which support the planetary gears 22A, 22B. Driving forces of the first and second motors 2A, 2B are inputted from the sun gears 21A, 21B, and the driving forces which are decelerated are outputted to the axles 10A, 10B via the planetary carriers 23A, 23B.

The sun gears 21A, 21B are formed integrally on the cylindrical shafts 16A. 16B. Additionally, the planetary gears 22A, 22B are double pinions having first pinions 26A. 26B which are larger in diameter and which mesh directly with the sun gears 21A, 21B and second pinions 27A, 27B which are smaller in diameter than the first pinions 26A, 26B. The first pinions 26A, 26B and the second pinions 27A, 27B are formed integrally so as not only to be concentric but also to be offset in an axial direction. The planetary gears 22A, 22B are supported on pinion shafts 32A, 32B of the planetary carriers 23A, 23B via needle bearings 31A, 31B. Axial inner end portions of the planetary carriers 23A. 23B extend radially inwards and are spline fitted on the axles 10A, 10B, whereby the planetary carriers 23A, 23B are supported on the axles 10A, 10B so as to rotate together. The planetary carriers 23A, 23B are also supported in the partition walls 18A, 18B via bearings 33A, 33B.

The ring gears 24A, 24B include gear portions 28A, 28B which mesh with the second pinion gears 27A, 27B, which are smaller in diameter, at inner circumferential surfaces thereof, small diameter portions 29A, 29B which are smaller in diameter than the gear portions 28A, 28B and which are disposed opposite to each other in a middle position of the case 11, and connecting portions 30A, 30B which connect axial inner end portions of the gear portions 28A, 28B and axial outer end portions of the small diameter portions 29A, 29B together in a radial direction.

The gear portions 28A, 28B face each other in the axial direction in such a way as to sandwich the third cylindrical wall 46 which is formed at a radially inner end portion of the left-right separating wall 45 of the central case 11M therebetween. The small diameter portions 29A, 29B spline fit in inner races 51 of a one-way clutch 50, which will be described later, at outer circumferential surfaces thereof, and the ring gears 24A, 24B are connected to each other so as to rotate together with the inner races 51 of the one-way clutch 50.

A hydraulic brake 60 which constitutes a brake unit for the ring gear 24B is disposed on the second planetary gear type speed reducer 12B side and between the second cylindrical wall 44 of the central case 11M which constitutes the case 11 and the gear portion 28B of the ring gear 24B in such a way as to overlap the first pinion 26B in the radial direction and to overlap the second pinion 27B in the axial direction. In the hydraulic brake 60, a plurality of fixed plates 35 which are spline fitted in an inner circumferential surface of the second cylindrical wall 44 and a plurality of rotational plates 36 which are spline fitted on an outer circumferential surface of the gear portion 28B of the ring gear 24B are disposed alternately in the axial direction, and these plates 35, 36 are engaged and released by an annular piston 37. The piston 37 is housed in an annular cylinder chamber which is defined between the left-right separating wall 45 and the third cylindrical wall 46 of the central case 1 IM so as to reciprocate freely therein. The piston 37 is biased in a direction in which the fixed plates 35 and the rotational plates 36 are released from each other at all times by an elastic member 39 which is supported a bearing seat 38 which is provided on an outer circumferential surface of the third cylindrical wall 46.

To describe in greater detail, a space defined between the left-right separating wall 45 and the piston 37 is made into a working chamber S into which the oil is directly introduced. When the pressure of the oil which is introduced into the working chamber S overcomes the biasing force of the elastic member 39, the piston 37 moves forwards (rightwards), and the fixed plates 35 and the rotational plates 36 are pressed against each other for engagement. On the other hand, when the biasing force of the elastic member 39 overcomes the pressure of the oil which is introduced into the working chamber S, the piston 37 moves backwards (leftwards), and the fixed plates 35 and the rotational plates 36 are separated from each other for release.

Figure 4:
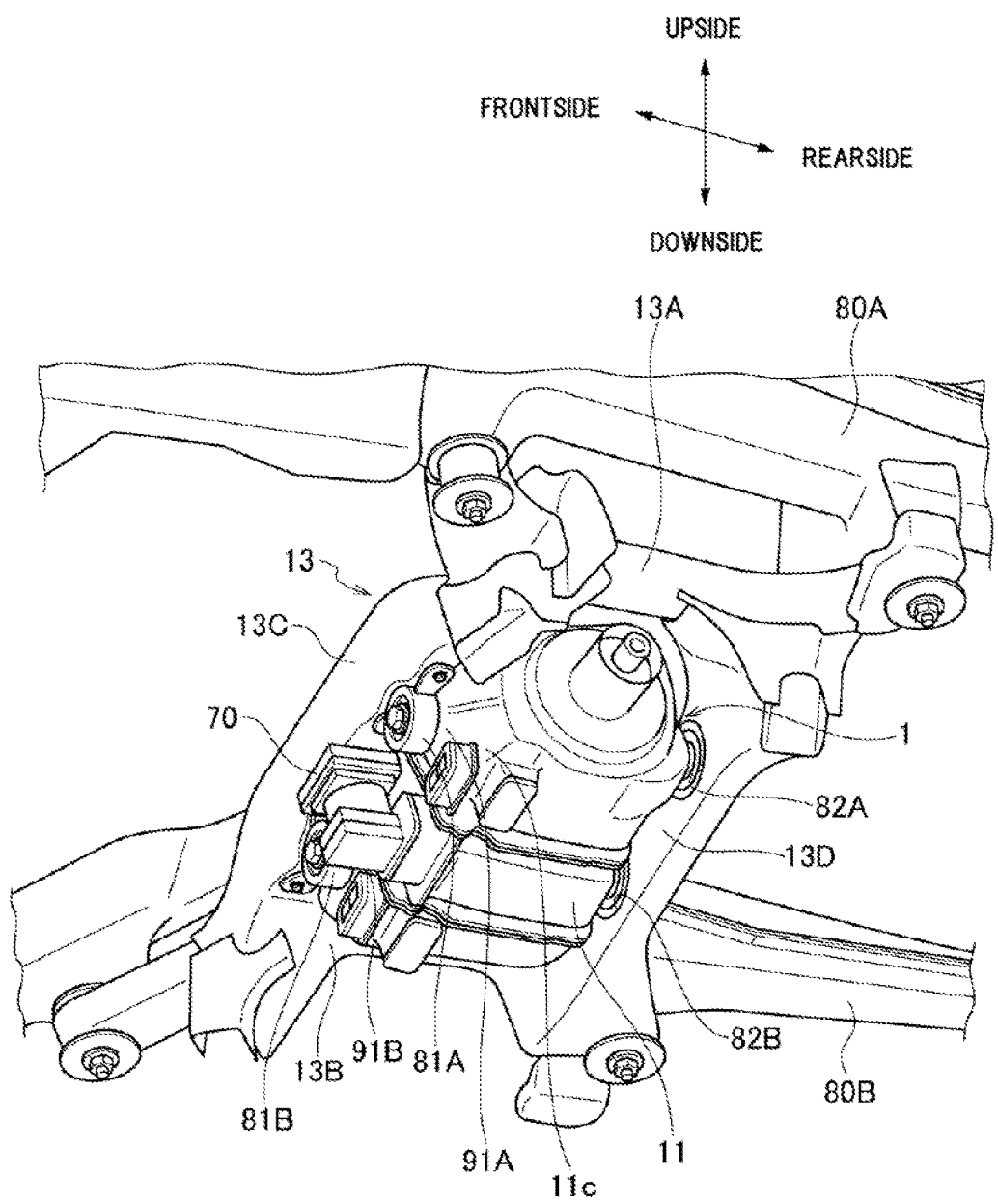
FIG. 4 is a perspective view of the rear wheel driving system which is supported by supporting devices as viewed obliquely upwards from a front and obliquely downward position.

The hydraulic brake 60 is connected to an oil pump 70 (refer to FIG. 4).

In this hydraulic brake 60, the fixed plates 35 are supported on the second cylindrical wall 44 which extends from the left-right separating wall 45 of the central case 11M which constitutes the case 11, and the rotational plates 36 are supported on the gear portion 28B of the ring gear 24. Therefore, when both the plates 35, 36 are pressed against each other by the piston 37, the plates 35, 36 are frictionally fastened together, and a braking force acts on the ring gear 24B, whereby the ring gear 24B is fixed. When the engagement by the piston 37 is released from that state, the ring gear 24B is permitted to rotate freely. Since the ring gears 24A, 24B are connected to each other as described above, when the hydraulic brake 60 is applied, the braking force also acts on the ring gear 24A and fixes the ring gear 24A. When the hydraulic brake 60 is released, the ring gear 24A is also permitted to rotate freely.

A space portion is also ensured between the connecting portions 30A, 30B of the ring gears 24A, 24B which are disposed opposite to each other in the axial direction. The one-way clutch 50 is disposed within the space portion, the one-way clutch 50 being configured to transmit power to the ring gears 24A, 24B only in one direction and to cut off power acting in the other direction. The one-way clutch 50 includes a large number of sprags 53 which are interposed between the inner races 51 and an outer race 52, and the inner races 51 rotate together with the small diameter portions 29A, 29B of the ring gears 24A, 24B through spline fitting. In addition, the outer race 52 is positioned by the third cylindrical wall 46 and is prevented from rotating thereby.

The one-way clutch 50 is engaged to lock the rotation of the ring gears 24A, 24B when the vehicle 3 travels forwards by the power of the first and second motors 2A, 2B. To describe this in greater detail, the one-way clutch 50 is engaged when the rotational power of the first and second motors 2A, 2B in a forward direction (a rotational direction when the vehicle 3 is caused to travel forwards) is inputted into the rear wheels Wr, while the one-way clutch 50 is disengaged when the rotational power of the first and second motors 2A, 2B in a reverse direction is inputted into the rear wheels Wr. The one-way clutch 50 is disengaged when the rotational power of the rear wheels Wr in the forward direction is inputted into the first and second motors 2A, 2B, while the one-way clutch 50 is engaged when the rotational power of the wheels Wr in the reverse direction is inputted into the first and second motors 2A, 2B.

Additionally, as shown in FIG. 4, the oil pump 70, which is one of accessories, is fixed to a front surface 11c of the central case 11M. The oil pump 70 is, for example, a trochoidal pump. The oil pump 70 is driven by a motor, not shown, such as a position sensor-less, brushless DC motor to suck in oil reserved in left and right reservoirs RL, RR so as to lubricate and cool the constituent members via lubrication paths 79A, 79B which are provided in the mechanism parts such as the case 11 and the axles 10A, 10B.

In the rear wheel driving system 1 of this embodiment that is configured as has been described heretofore, the one-way clutch 50 and the hydraulic brake 60 are disposed in parallel on the power transmission path between the first and second motors 2A, 2B and the rear wheels Wr.

Here, the hydraulic brake 60 is controlled to be put in a released state, a weakly applied state, or an applied state by the pressure of oil supplied from the oil pump 70 in accordance with the traveling state of the vehicle or whether the one-way clutch 50 is engaged or disengaged. For example, when the vehicle 3 travels forwards (at low vehicle speeds or middle vehicle speeds) by the power driving of the first and second motors 2A, 2B, the one-way clutch 50 is engaged so that a power-transmission permitted state is realized. In addition, the hydraulic brake 60 is controlled to be put in the weakly applied state, and therefore even though the one-way clutch 50 is disengaged as a result of the input of forward rotational power from the first and second motors 2A, 2B being reduced temporarily, it is possible to suppress the occurrence of a risk such that power is not transmitted between the first and second motors 2A, 2B and the rear wheels Wr. Additionally, when the vehicle 3 travels forwards by the internal combustion engine 4 and/or the power driving of the motor 5 (at high vehicle speeds), the one-way clutch 50 is disengaged, and the hydraulic brake 60 is controlled to be put in the released state, whereby it is possible to prevent the excessive rotation of the first and second motors 2A, 2B. On the other hand, when the vehicle 3 is reversed or is decelerated while regenerating energy, the one-way clutch 50 is disengaged, and the hydraulic brake 60 is controlled to be put in the applied state, whereby the reverse rotational power is outputted to the rear wheels Wr from the first and second motors 2A, 2B, or the forward rotational power of the rear wheels Wr are inputted into the first and second motors 2A, 2B.

Next, referring to FIGS. 4 and 5, a supporting construction of the rear wheel driving system 1 will be described in detail. As is obvious from FIG. 1, the rear wheel driving system 1 is disposed so as to be offset to a rear side of the vehicle 3 with respect to a center thereof in the front-rear direction, and a passenger compartment C (refer to FIG. 5) is defined ahead of and above the rear wheel driving system 1. As shown in FIG. 4, the rear wheel driving system 1 is supported by a sub-frame 13 which is supported by a pair of side frames 80A, 80B which extend in the front-rear direction. The sub-frame 13 is a substantially rectangular frame member which is formed of a pair of sub-side frames 13A, 13B which extend in the front-rear direction of the vehicle 3 and a front cross frame 13C and a rear cross frame 13D which extend in a left-right direction of the vehicle 3 to be fixed to the pair of sub-side frames 13A, 13B, and a space where the rear wheel driving system 1 is disposed is formed in the center of the substantially rectangular frame member.

A pair of brackets 81A. 81B are fixed to the front cross frame 13C with bolts in symmetrical positions with respect to a center of the vehicle 3 in the left-right direction. Additionally, supporting portions 82A. 82B penetrate the rear cross frame 13D in positions which correspond to the pair of brackets 81A, 81B in the left-right direction. Mounting members 85 where bolts 84 are inserted via elastic members 83 are fixed to the brackets 81A, 81B and the supporting portions 82A, 82B of the rear cross frame 13D.

Front fixing portions 91A, 91B in which internal threads are formed are formed on the front surface 11c of the case 11 of the rear wheel driving system 1 which is supported by the sub-frame 13 so as to project therefrom to correspond to the pair of the brackets 81A, 81B. Additionally, rear fixing portions 92A, 92B in which internal threads are formed are formed on a rear surface 11d of the rear cross frame 13D so as to project therefrom to correspond to the supporting portions 82A, 82B.

Here, in the front fixing portions 91A, 91B and the rear fixing portions 92A, 92B which are formed on the case 11 of the rear wheel driving system 1, the rear fixing portions 92A, 92B which are situated on the side of the vehicle 3 where the rear wheel driving system 1 is disposed, that is, on the rear side of the vehicle 3 are formed in higher positions in the vertical direction than the front fixing portions 91A, 91B which are situated at the front side of the vehicle 3.

The bolts 84 are fastened from the outside of the mounting members 85 so that the rear wheel driving system 1 is disposed in the interior of the sub-frame 13, the front fixing portions 91A, 91B of the case 11 are disposed opposite to the brackets 81A, 81B, and the rear fixing portions 92A, 92B of the case 11 are disposed opposite to the supporting portions 82A, 82B of the rear cross frame 13D, whereby the rear wheel driving system 1 is fixed to the sub-frame 13.

Figure 5:
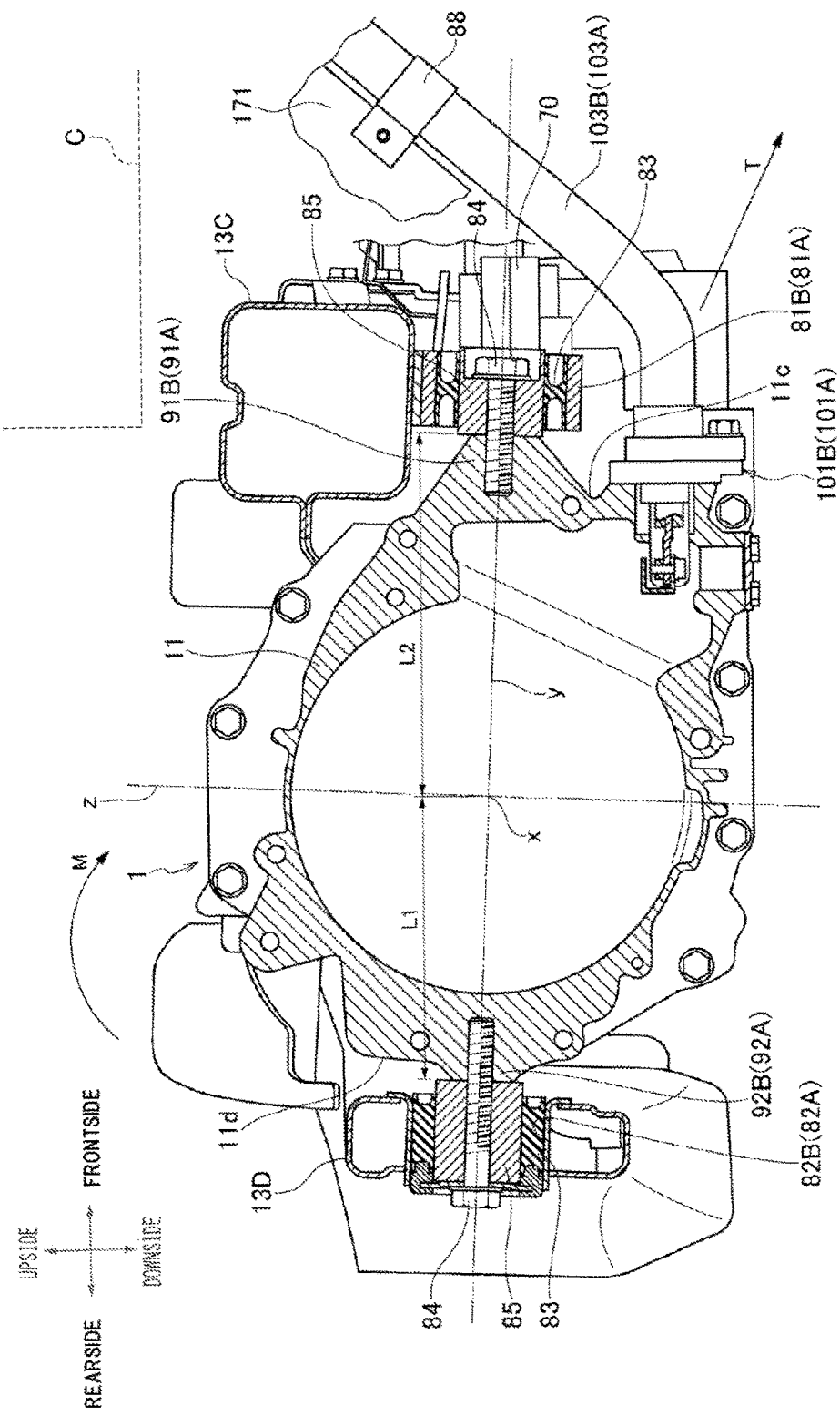
FIG. 5 is a sectional view of the rear wheel driving system which is supported by the supporting devices.
Figure 6A:
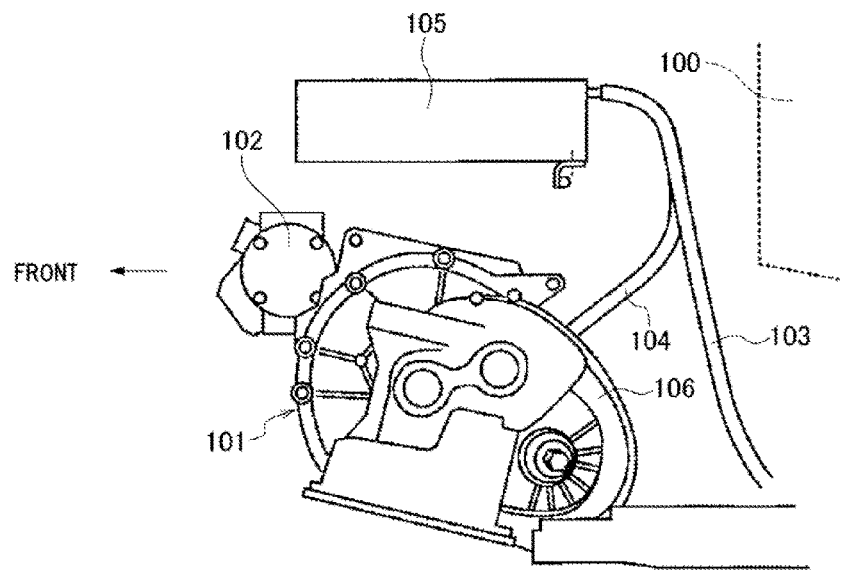
FIG. 6A is a view showing a driving unit described in Patent Literature 1 before the vehicle is involved in a collision.
Figure 6B:
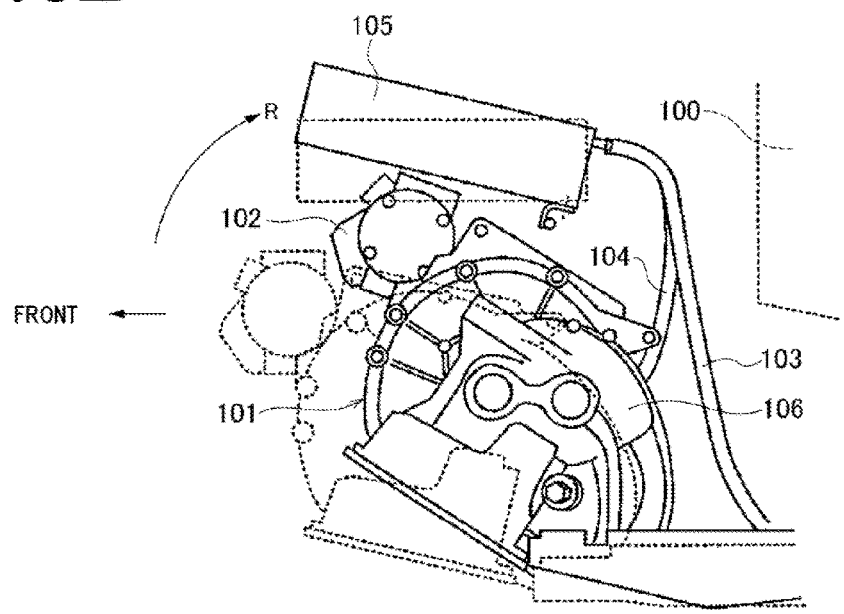
FIG. 6B is a view showing the driving unit described in Patent Literature 1 after the vehicle is involved in a collision.

In the rear wheel driving system 1 which is fixed to the sub-frame 13, an imaginary straight line y which passes through centers of the front fixing portions 91A, 91B (centers of the bolt holes) and centers of the rear fixing portions 92A, 92B (centers of the bolt holes) is inclined downwards from the rear side towards the front side (downwards to the right in FIG. 5). It is preferable that the imaginary straight line y is inclined, for example, at an angle of 0.5° to 5° relative to a horizontal plane.

By disposing the rear wheel driving system 1 which is disposed on the rear side of the vehicle 3 so as to be inclined downwards towards the front from the rear side to the front side, when the vehicle 3 is involved in a collision from the rear thereof (hereinafter, referred to as a rear collision) which would affect largely the rear wheel driving system 1, a clockwise moment M shown in FIG. 5 is produced which raises a rear side of the rear wheel driving system 1 upwards and lowers a front side thereof downwards as the rear wheel driving system 1 moves. Then, the rear wheel driving system 1 is caused to move in a direction indicated by an arrow T in FIG. 5, that is, in a direction in which the rear wheel driving system 1 moves away from the passenger compartment C by means of an external force applied and the moment M produced in association with the rear collision. Consequently, the dynamic action acting on the passenger compartment C in association with the rear collision can be mitigated, thereby making it possible to enhance the safety of passengers in the passenger compartment C when the vehicle 3 is involved in the rear collision.

In addition, since a distance L1 from a rotating axis x of the first and second motors 2A, 2B to a distal end portion of the rear fixing portions 92A, 92B is shorter than a distance L2 from the rotating axis x to a distal end portion of the front fixing portions 91A, 91B, even though the clockwise moment M is produced when the rear wheel driving system 1 moves, since the longer side moves away from the passenger compartment, the negative influence on the passenger compartment can be suppressed further.

In addition, a first and second connector 101A, 101B are provided in the case 11 so as to electrically connect bus bars to which wires of three phases of the stators coils coiled around stators 14A, 14B are connected and conductive cables 103A, 103B which are external electrical conductors extending from external equipment, not shown.

As shown in FIG. 5, the first and second connectors 101A, 101B are formed below the imaginary straight line y and ahead of another imaginary straight line z which passes through the rotating axis x of the first and second motors 2A, 2B and intersects the imaginary straight line y at a right angle, when looking at the rear wheel driving system 1 from a side thereof. In this way, since the first and second connectors 101A, 101B are disposed below the imaginary straight line y, should the conductive cables 103A, 103B be dislocated from the rear wheel driving system 1, it is difficult that the dislocated conductive cables 103A, 103B are directed to reach the passenger compartment, and hence, an electrical action which would act on the passenger compartment C when the vehicle 3 is involved in a rear collision can be mitigated, thereby making it possible to enhance further the safety of the passengers in the passenger compartment C at the time of the rear collision. Additionally, since the first and second connectors 101A, 101B are formed ahead of the other imaginary straight line z, that is, they are the same side as the direction in which the rear wheel driving system 1 is caused to move, it becomes difficult that the conductive cables 103A. 103B are dislocated therefrom.

Further, the first and second connectors 101A, 101B are disposed near positions lying below the front fixing portions 91A, 91B which are fixed to the brackets 81A, 81B. Since the first and second connectors 101A, 101B are disposed below the front fixing portions 91A, 91B, it becomes more difficult that the dislocated conductive cables 103A, 103B are directed to reach the passenger compartment, thereby making it possible to enhance further the safety of the passengers in the passenger compartment C at the time of the collision. Additionally, the first and second connectors 101A, 101B can be accessed from an underside of the vehicle 3 in such a state that the rear wheel driving system 1 is fixed to the sub-frame 13 with the brackets 81A, 81B, whereby the assemblage and maintenance of the first and second connectors 101A, 101B can be facilitated, thereby the working performance being enhanced. Since the brackets 81A, 81B and the sub-frame 13 are disposed so as to cover the first and second connectors 101A, 101B from above, the first and second connectors 101A, 101B are protected from an object which falls from thereabove.

The first connector 101A and the second connector 101B are disposed near the oil pump 70 in the left-right direction so as to sandwich therebetween the oil pump 70 which is situated at the center of the front surface 11c of the case 11 in the left-right direction. Consequently, the oil pump 70 is disposed so as not to be an obstacle to accessing the first connector 101A and the second connector 10B.

The conductive cables 103A, 103B extending from the first and second connectors 101A, 101B are routed to the front and upwards while being bent in the left-right direction and are fixed to the floor panel 171 with electric wire supporting brackets 88. The conductive cables 103A, 103B may be fixed to the side frames 80A, 80B in place of the floor panel 171. The fixing position by the electric wire supporting bracket 88, that is, the electric wire supporting bracket 88 which lies nearest to the rear wheel driving system 1 is situated in such a position that distal ends of the conductive cables 103A, 103B are prevented from touching the ground in case the conductive cables 103A, 103B are dislocated from the rear wheel driving system 1, as a result of which the conductive cables 103A, 103B droops vertically from the electric wire supporting bracket 88 as a fulcrum. This can restrict the conductive cables 103A, 103B from touching the ground should the conductive cables 103A, 103B be dislocated from the rear wheel driving system 1.

Thus, as has been described heretofore, according to the embodiment, in the front fixing portions 91A, 91B and the rear fixing portions 92A, 92B which are formed on the case 11 of the rear wheel driving system 1, the rear fixing portions 92A, 92B which are situated on the side of the vehicle 3 where the rear wheel driving system 1 is disposed, that is, on the rear side of the vehicle 3 are formed in higher positions in the vertical direction than the front fixing portions 91A, 91B which are situated at the front side of the vehicle 3. Namely, the rear wheel driving system 1 which is disposed on the rear side of the vehicle 3 is disposed so as to be inclined downwards towards the front from the rear side towards the front side. By adopting this configuration, when the vehicle 3 is involved in a rear collision which would affect largely the rear wheel driving system 1, the rear wheel driving system 1 can be caused to move away from the passenger compartment by the external force applied thereto and the moment M produced in the rear wheel driving system 1 in such a way as to raise the rear side upwards and lower the front side thereof downwards by the rear collision, whereby the dynamic action that would act on the passenger compartment C at the time of the rear collision can be mitigated, thereby making it possible to enhance the safety of the passengers in the passenger compartment C when the vehicle 3 is involved in the rear collision.

In addition, in the rear wheel driving system 1, when looking at the rear wheel driving system 1 from the side thereof, since the first and second connectors 101A, 101B to which the conductive cables 103A, 103B for supplying electric power to the first and second electric motors 2A, 2B are fixed are formed below the imaginary straight line y which passes the centers of the rear fixing portions 92A, 92B and the centers of the front fixing portions 91A, 91B, should the conductive cables 103A, 103B be dislocated from the rear wheel driving system 1, it becomes difficult that the dislocated conductor cables 103A, 103B are directed to reach the passenger compartment, whereby the electrical action that would act on the passenger compartment C at the time of the rear collision can also be mitigated, thereby making it possible to enhance further the safety of the passengers in the passenger compartment C.

The supporting construction of the rear wheel driving system 1 that has been described heretofore may be applied not only to the rear wheel driving system 1 but also to the front wheel driving system 6. As this occurs, in the front fixing portions 91A, 91B and the rear fixing portions 92A, 92B, the front fixing portions 91A, 91B which are situated on the side of the vehicle 3 where the front wheel driving system 6 is disposed, that is, on the front side of the vehicle 3 are formed in higher positions in the vertical direction than the rear fixing portions 92A, 92B which are situated at the rear side of the vehicle 3. Namely, the front wheel driving system 6 which is disposed on the front side of the vehicle 3 is disposed so as to be inclined downwards towards the rear from the front side towards the rear side. By adopting this configuration, when the vehicle 3 is involved in a frontal collision which would affect largely the front wheel driving system 6, the front wheel driving system 6 can be caused to move away from the passenger compartment by means of an external force applied to and a moment produced in the front wheel driving system 6 in such a way as to raise a front side upwards and lower a rear side thereof downwards by the frontal collision, whereby a dynamic action that would act on the passenger compartment C at the time of the frontal collision can be mitigated, thereby making it possible to enhance the safety of the passengers in the passenger compartment C when the vehicle 3 is involved in the frontal collision.

In this case, the first and second connectors 101A, 101B are preferably formed below the imaginary straight line y when looking at the front wheel driving system 6 from a side thereof. By adopting this configuration, similar to the case with the supporting construction of the rear wheel driving system 1, an electrical action that would act on the passenger compartment C at the time of the frontal collision can also be mitigated, thereby making it possible to enhance further the safety of the passengers in the passenger compartment C when the vehicle 3 is involved in the frontal collision.

In the embodiment, while the first and second motors 2A, 2B and the first and second planetary gear type speed reducers 12A, 12B are described as being disposed within the case 11, the first and second planetary gear type speed reducers 12A, 12B are not necessarily required. Hence, the first and second motors 2A, 2B may be connected directly to the left rear wheel LWr and the right rear wheel RWr. In addition, only one motor may be disposed so that the left rear wheel LWr and the right rear wheel RWr are driven through the use of the one motor as a drive source. As these occurs, in the embodiment, the supporting construction of the rear wheel driving system 1 can be taken as a supporting construction of the motor.

The invention is not limited to the embodiment that has been described heretofore and hence can be modified or improved as required. For example, in the embodiment, while the hybrid vehicle is described as being the vehicle to which the invention is applied, the invention is not limited thereto, and hence, the invention may be applied, for example, to an electric vehicle which uses only a motor as a drive source.

In addition, although the front fixing portions and the rear fixing portions may be supported at plural points, in case the plural supporting points differ in height, an average height (a center) of the front fixing portions which differ in height of the supporting points should be referred to as a height of the front fixing portions, and an average height (a center) of the rear fixing portions which differ in height of the supporting points should be referred to as a height of the rear fixing portions.

Additionally, in the embodiment, while the two front fixing portions and the two rear fixing portions are provided, one front fixing portion and one rear fixing portion may be provided. As this occurs, it is preferable that the front fixing portion and the rear fixing portion are situated at a center in the vehicle's width direction.

This patent application is based on the Japanese Patent Application (No. 2013-249612) filed on Dec. 2, 2013, the contents of which are incorporated herein by reference.

DESCRIPTION OF REFERENCE NUMERALS AND CHARACTERS 2A first motor (motor)
2B second motor (motor)
3 vehicle
13 sub-frame (frame member)
80A, 80B side frame (body member)
81A, 81B bracket (supporting device)

82A, 82B supporting portion (supporting device)
88 electric wire supporting bracket (electric wire supporting device)
91A, 91B front fixing portion (second fixing portion)
92A, 92B rear fixing portion (first fixing portion)
101A, 101B first and second connector (electric wire fixing portion)
103A, 103B conductive cable (electric wire)
171 floor panel (body member)
x rotating axis
y imaginary straight line
z another imaginary straight line
Wr rear wheel (wheel)
L1 distance from rotating axis of motor to distal end portion of first fixing portion
L2 distance from rotating axis of motor to distal end portion of second fixing portion

The invention claimed is:

1. A vehicle comprising:
a motor, which drives a wheel of the vehicle; and
a frame member, which supports the motor via at least two supporting devices,
wherein the motor is disposed so as to be offset to a first side with respect to a center of the vehicle in a front-to-rear direction thereof;
wherein a first fixing portion, which is situated relatively closer to the first side, among fixing portions of the motor to which the at least two supporting devices are fixed, is formed in a higher position in a vertical direction than a second fixing portion, which is situated relatively closer to a second side, among the fixing portions, the second side being opposite the first side in the front-to-rear direction;
wherein an electric wire fixing portion of the motor, to which an electric wire for supplying electric power to the motor is fixed, is formed in a position below a first imaginary straight line, which passes through a center of the first fixing portion and a center of the second fixing portion, in a side view of the motor;
wherein the motor is disposed between the first fixing portion and the second fixing portion, in the front-to-rear direction;
wherein the electric wire fixing portion is formed closer to the second side than an intersection of the first imaginary straight line and a second imaginary straight line, the second imaginary straight line passing through a rotating axis of the motor and intersecting with the first imaginary straight line at a right angle;
wherein the electric wire fixing portion is formed below the second fixing portion; and
wherein the supporting device which is fixed to the second fixing portion, or the frame member on which the supporting device is provided, is disposed so as to cover the electric wire fixing portion from above.

2. The vehicle according to claim 1, wherein the first straight imaginary line passes through a rotating axis of the motor.

3. The vehicle according to claim 2, wherein the vehicle is a four-wheel vehicle.

4. The vehicle according to claim 3, the motor is disposed between a left wheel and a right wheel of the four-wheel vehicle.

5. The vehicle according to claim 1, wherein the vehicle is a four-wheel vehicle.

6. The vehicle according to claim 5, the motor is disposed between a left wheel and a right wheel of the four-wheel vehicle.

7. The vehicle according to claim 1, wherein
the vehicle comprises electric wire supporting devices, which support the electric wire on the frame member or a body member, and
an electric wire supporting device, which is nearest to the motor, among the electric wire supporting devices, is disposed in such a position that a distal end of the electric wire is prevented from reaching a ground when the electric wire is dislocated from the motor and droops vertically from the electric wire supporting device as a fulcrum.

8. The vehicle according to claim 1, wherein
a distance from the rotating axis of the motor to a distal end portion of the first fixing portion is shorter than a distance from the rotating axis to a distal end portion of the second fixing portion.

9. A vehicle comprising:
a motor, which drives a wheel of the vehicle; and
a frame member, which supports the motor via at least two supporting devices,
wherein the motor is disposed so as to be offset to a first side with respect to a center of the vehicle in a front-to-rear direction thereof;
wherein a first fixing portion, which is situated relatively closer to the first side, among fixing portions of the motor to which the at least two supporting devices are fixed, is formed in a higher position in a vertical direction than a second fixing portion, which is situated relatively closer to a second side, among the fixing portions, the second side being opposite the first side in the front-to-rear direction;
wherein an electric wire fixing portion of the motor, to which an electric wire for supplying electric power to the motor is fixed, is formed in a position below a first imaginary straight line, which passes through a center of the first fixing portion and a center of the second fixing portion, in a side view of the motor;
wherein the motor is disposed between the first fixing portion and the second fixing portion, in the front-to-rear direction; and
wherein the first straight imaginary line passes through a rotating axis of the motor.

10. The vehicle according to claim 9, wherein the electric wire fixing portion is formed closer to the second side than an intersection of the first imaginary straight line and a second imaginary straight line, the second imaginary straight line passing through a rotating axis of the motor and intersecting with the first imaginary straight line at a right angle.

11. The vehicle according to claim 9, wherein
the electric wire fixing portion is formed below the second fixing portion.

12. A vehicle comprising:
a motor, which drives a wheel of the vehicle; and
a frame member, which supports the motor via at least two supporting devices,
wherein the motor is disposed so as to be offset to a first side with respect to a center of the vehicle in a front-to-rear direction thereof;
wherein a first fixing portion, which is situated relatively closer to the first side, among fixing portions of the motor to which the at least two supporting devices are fixed, is formed in a higher position in a vertical direction than a second fixing portion, which is situated relatively closer to a second side, among the fixing portions, the second side being opposite the first side in the front-to-rear direction;

wherein an electric wire fixing portion of the motor, to which an electric wire for supplying electric power to the motor is fixed, is formed in a position below a first imaginary straight line, which passes through a center of the first fixing portion and a center of the second fixing portion, in a side view of the motor;

wherein the motor is disposed between the first fixing portion and the second fixing portion, in the front-to-rear direction; and wherein a distance from the rotating axis of the motor to a distal end portion of the first fixing portion is shorter than a distance from the rotating axis to a distal end portion of the second fixing portion.

13. The vehicle according to claim 12, wherein the first straight imaginary line passes through a rotating axis of the motor.

14. The vehicle according to claim 13, wherein the vehicle is a four-wheel vehicle.

15. The vehicle according to claim 14, the motor is disposed between a left wheel and a right wheel of the four-wheel vehicle.

16. The vehicle according to claim 12, wherein the electric wire fixing portion is formed closer to the second side than an intersection of the first imaginary straight line and a second imaginary straight line, the second imaginary straight line passing through a rotating axis of the motor and intersecting with the first imaginary straight line at a right angle.

17. The vehicle according to claim 16, wherein the electric wire fixing portion is formed below the second fixing portion.

18. The vehicle according to claim 12, wherein the vehicle is a four-wheel vehicle.

19. The vehicle according to claim 18, the motor is disposed between a left wheel and a right wheel of the four-wheel vehicle.

20. The vehicle according to claim 12, wherein the vehicle comprises electric wire supporting devices, which support the electric wire on the frame member or a body member, and wherein an electric wire supporting device, which is nearest to the motor, among the electric wire supporting devices, is disposed in such a position that a distal end of the electric wire is prevented from reaching a ground when the electric wire is dislocated from the motor and droops vertically from the electric wire supporting device as a fulcrum.

\* \* \* \* \*